Oct. 31, 1950  J. W. ORENDORFF  2,527,843
TOPPING MECHANISM FOR BEETS AND THE LIKE
Filed Nov. 22, 1947  2 Sheets-Sheet 1

INVENTOR.
John W. Orendorff
BY

Oct. 31, 1950  J. W. ORENDORFF  2,527,843
TOPPING MECHANISM FOR BEETS AND THE LIKE
Filed Nov. 22, 1947  2 Sheets-Sheet 2

INVENTOR.
John W. Orendorff
BY Paul O. Pippel
Atty.

Patented Oct. 31, 1950

2,527,843

UNITED STATES PATENT OFFICE 2,527,843

TOPPING MECHANISM FOR BEETS AND THE LIKE

John W. Orendorff, Canton, Ill., assignor to International Harvester Company, a corporation of New Jersey Application November 22, 1947, Serial No. 787,513

12 Claims. (Cl. 56—121.45)

This invention relates to agricultural implements and particularly to a harvesting mechanism for beets and the like. More specifically, the invention relates to a top disposal unit.

It is an object of the invention to provide for a beet harvester or the like an improved mechanism for removing the tops from the beets by means of a cutting blade and discharging the beet tops therefrom so that they may be later gathered and serve as food for livestock or for other purposes.

Another object of the invention is to provide, in combination with a cutting blade for severing the tops from beets, an improved top flinger in the form of a rotary drum having parts projecting radially therefrom in a position to engage the tops as they are severed by the blade and discharged then therefrom.

Another object of the invention is to provide an improved top flinger for use in connection with a beet topping unit wherein the flinger is closely associated with the cutting member and is capable of floating movement with respect thereto in order to avoid accumulations of material between the flinger and the cutting element which would tend to interrupt the operation of the machine.

Another object of the invention is to provide in combination with a cutting blade for removing the crown and foliage from the beets, an improved flinger for laterally diverting the beet tops, comprising a rotary drum having radially projecting fingers mounted upon an arm pivotally connected to the topping mechanism for movement of the drum toward and away from the blade and resilient means for resisting such movement.

Other objects and advantages of the invention will become apparent from the following detailed description when read in conjunction with the accompanying drawings in which.

Figure 1:
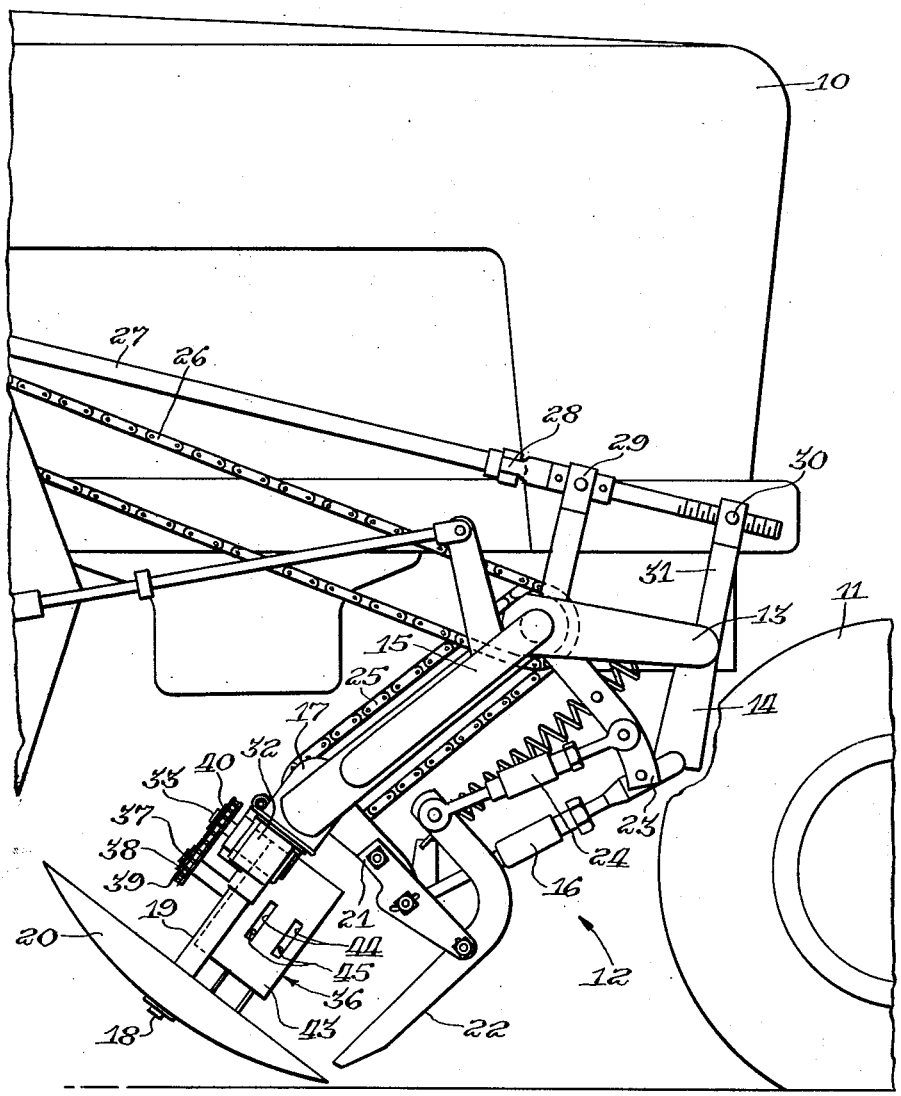
Figure 1 is a view in side elevation of the forward end of a tractor showing a top disposal unit forming a part of a beet harvesting machine with which the present invention is concerned.

Referring to the drawings, the numeral 10 designates the longitudinally extending body of a tractor, only the front end of which is shown, and 11, the dirigible front wheels thereof. On the side of the tractor is mounted a beet topping unit 12 and it may be understood that this topping unit is a part of a harvesting machine such as is described in pending U. S. application Serial No. 704,069, filed October 18, 1946, now Patent No. 2,491,203, issued December 13, 1949, to which reference may be had for many of the structural details of the topping mechanism and of the harvester as a whole.

It may be noted generally that the topping mechanism with which the present invention is concerned comprises a bracket 13 secured to the side of the tractor and having depending therefrom a lug 14. To the bracket 13 and the lug 14 are pivotally connected generally parallel link structures 15 and 16.

Upper link 15 has pivotally connected to its rear end a housing 17 from which extends in a downward and rearward direction a shaft 18 enclosed in a casing 19. Upon the lower end of the shaft 18 is mounted for rotation a disk-shaped cutting blade 20.

Secured to and depending from the housing 17 is an arm 21 to which the rear end of the lower link 16 is pivotally connected and which serves for the mounting of a feeler gauge 22. The forward end of link 15 is bent laterally and there is secured thereto an arm 23 to which is connected one end of a turnbuckle 24, the other end of which is pivoted to an upwardly extending arm of the feeler gauge 22 for adjustment thereof. The feeler gauge is pivotally mounted upon the lower end of arm 21.

The shaft 18 is provided at its upper end (not shown) within the housing 17 with suitable gearing connected by a chain drive 25 with a sprocket rotatably mounted upon the transverse portion of the upper link 15. A similar sprocket is provided with a chain 26 connected to a power take-off shaft (not shown) on the tractor. Drive is thus transmitted through the tractor power plant through chains 26 and 25 to operate the shaft 18 and rotate disk 20.

Lifting of the topping unit 12 may be accomplished through the intermediary of a crank 27, only the forward end of which is shown, connected by a universal joint 28 to an arm 29 secured to the transverse portion of the upper link 15. The forward end of the crank 27 extends beyond the arm 29 and is threaded at its end for reception in a swivel 30 carried at the upper end of an arm 31 secured to the bracket 13.

Likewise secured to the housing 17 is another housing 32 in which is mounted a shaft 33 which is suitably connected by gearing, not shown, with the gearing in housing 17 so that drive from the power take-off shaft of the tractor is transmitted through the housings 17 and 32 to the shaft 33.

Pivotally connected to the housing 32 is a bell crank 34 having an arm 35 extending laterally in a direction generally perpendicular to shaft 18. Mounted upon the arm 35 is a rotary drum 36 having an axle 37 which extends laterally from the drum and has keyed thereto a sprocket wheel 38 drivingly connected by a chain 39 with a sprocket wheel 40 mounted upon the shaft 33. It is now understood that drive is transmitted from the power take-off shaft of the tractor to operate both the cutting disk 20 and the rotary drum 36. The axle 37 upon which the drum is mounted is laterally spaced from the shaft 18 and is generally parallel to the plane of the cutting disk 20. The drum 36 is mounted upon the arm 35 by means of bolts 41 receivable in slots 42 in the arm 35 to provide for adjustment of the drum and tightening of the driving chain 39.

For the purposes of the present invention, the construction of the drum 36 may be regarded as substantially conventional. The drum 36 comprises a cylindrical casing 43 of circumferentially spaced openings 44 in the periphery thereof. A number of radial fingers 45 are secured about the axle 37 and project through the openings 44. The rotary drum member 36 is preferably of the disappearing finger type, that is, at a region adjacent the disk 20 the fingers 45 project farther from the periphery of the drum.

Figure 2:
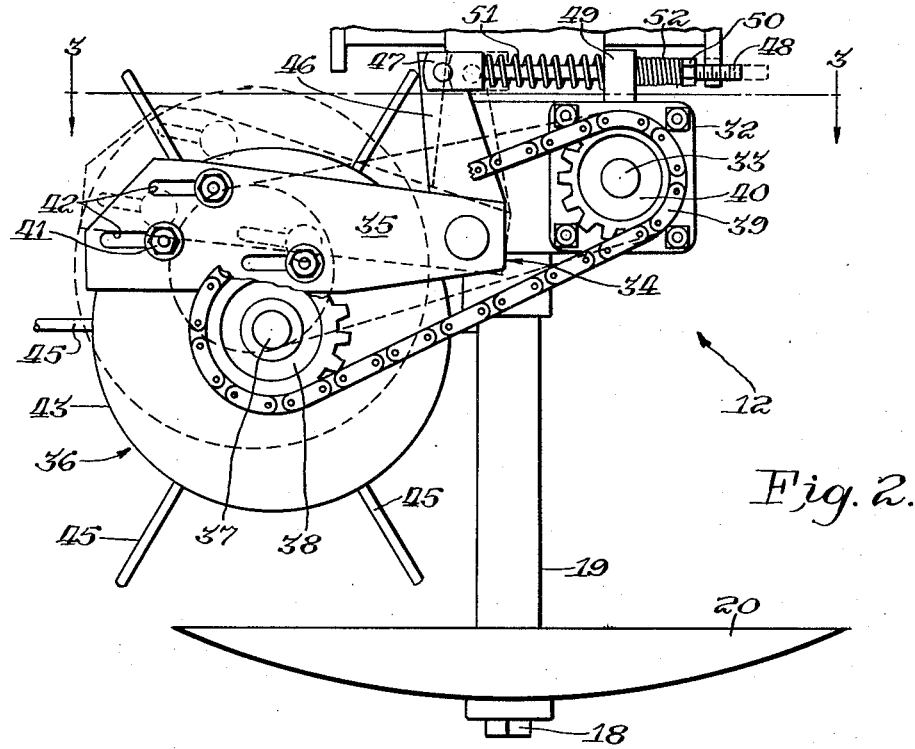
Figure 2 is an enlarged view in elevation of the topping mechanism of the present invention showing the flinger drum and indicating in dotted lines the movement thereof with respect to the cutting blade.
Figure 3:
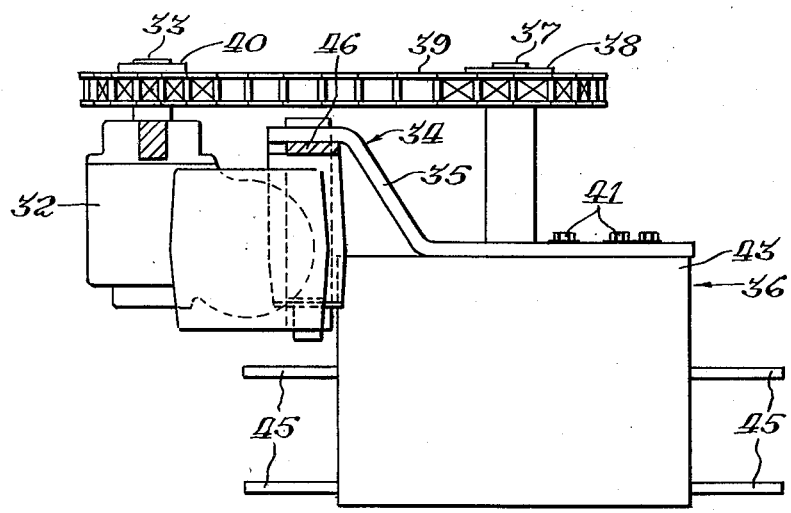
Figure 3 is a view taken on the line 3—3 of Figure 2.

It should now be clear that by virtue of the pivotal mounting of the drum 36 with respect to the top disposal unit, the drum is capable of moving toward and away from the disk 20. This feature is very important because during rotation of the drum the fingers 45 come into engagement with the beet tops severed by the disks 20 and it often happens that hard material picked up by the disk 20 becomes lodged between one or more of the fingers 45 and the upper surface of the disk. In such instance, if no provision were made for allowing the rotary member to move away from the disk, the machine would be fouled and stoppage would be necessitated. For best results, it is desirable that the relationship between the disk and the drum be such as that shown in Figure 2 for normal operation but that provision be made for movement of the drum away from the disk to allow for the passage of foreign matter. It is likewise desirable that the drum be maintained resiliently in its normal operating position. Therefore, the other arm 46 of the bell crank is provided at its upper end with a pivoted clevis 47 to which is secured one end of a rod 48 slidably received in an opening in a lug 49 secured to the housing 32. The end of rod 48 extending through the lug 49 is threaded and provided with an adjustable nut 50. A spring 51 surrounds the rod 48 between the clevis 47 and the lug 49 and is compressed when the drum 36 moves upwardly away from disk 20 to the dotted line position indicated in Figure 2. Since the spring 51 is under compression the drum is constantly urged to return to its normal operating position.

In order to avoid shock to the drum upon its return to operating position after the passage of foreign material between the drum and the disk, a spring 52 is provided upon the rod 48 between the lug 49 and nut 50. This spring likewise assists in balancing the drum 36 and to maintain it in its proper operating position.

It is believed that this invention will be clear from the foregoing description. However, it should likewise be understood that the invention has been illustrated and described in its preferred embodiment and that modifications may be made therein without departing from the spirit thereof. It is therefore desired that the invention be limited only by the scope of the appended claims.

What is claimed is:

1. In a power driven machine for harvesting beets and the like, a support, a cutting blade mounted on the support for vertical floating movement with respect thereto to sever the tops from the beets, a rotary member carried adjacent said blade and spaced axially therefrom sufficiently to accommodate passage of the tops therebetween, said member being rotatable on an axis generally parallel to the blade and having radially projecting parts engageable with the tops severed by the blade, and means for mounting said rotary member for floating movement in a direction generally perpendicular to the plane of the blade.

2. In a power driven machine for harvesting beets and the like, a support, a cutting blade mounted on the support for vertical floating movement with respect thereto to sever the tops from the beets, a rotary member carried adjacent said blade and spaced axially therefrom sufficiently to accommodate passage of the tops therebetween, said member being rotatable on an axis generally parallel to the blade and having radially projecting parts engageable with the tops severed by the blade, means for mounting said rotary member for floating movement toward and away from the disk in a direction generally perpendicular to the plane of the blade, and means yieldably resisting movement of the rotary member in either direction with respect to the blade.

3. In a power driven machine for harvesting beets and the like, a support, a cutting blade mounted on the support for vertical floating movement with respect thereto to sever the tops from the beets, a rotary member carried adjacent said blade, said member being rotatable on an axis generally parallel to the blade and having radially projecting parts engageable with the tops severed by the blade, means for mounting said rotary member for movement toward and away from said blade, means biasing the rotary member toward the blade, said means being yieldable to accommodate movement of the member away from the blade, stop means limiting movement of the member toward the blade, and resilient means between the member and the stop means.

4. In a power driven machine for harvesting beets and the like, a support, a cutting blade mounted on the support for vertical floating movement with respect thereto to sever the tops from the beets, a rotary member carried adjacent said blade, said member being rotatable on an axis generally parallel to the blade and having radially projecting parts engageable with the tops severed by the blade, means for mounting said rotary member for movement toward and away from said blade, a spring biasing the rotary member toward the blade, said spring being yieldable to accommodate movement of the member away from the blade, and a second spring resiliently limiting movement of the member toward the blade.

5. In a power driven machine for harvesting beets and the like, a support, a cutting blade mounted on the support for vertical floating movement with respect thereto to sever the tops from the beets, a rotary member carried adjacent said blade, said member being rotatable on an axis generally parallel to the blade and having radially projecting parts engageable with the tops severed by the blade, means for mounting said rotary member for movement toward and away from said blade, a spring biasing the rotary member toward the blade, said spring being yieldable to accommodate movement of the member away from the blade, stop means limiting movement of the member toward the blade, and a second spring between the member and the stop means, said second spring being weaker than the first mentioned spring.

6. In a power driven machine for harvesting beets and the like, a support, a topping unit mounted on the support for vertical floating movement with respect thereto and including a rotary cutting disk for severing the tops from the beets, means deriving power from the machine for driving said disk, a rotary flinger member mounted on the topping unit adjacent said disk for relative movement to opposite sides of a normal operating position toward and away from the disk in a direction generally parallel to the axis thereof, said member having parts engageable with the beet tops to discharge the latter from the disk.

7. In a power driven machine for harvesting beets and the like, a support, a topping unit mounted on the support for vertical floating movement with respect thereto and including a rotary cutting disk for severing the tops from the beets, means deriving power from the machine for driving said disk, a rotary flinger member mounted on the topping unit adjacent said disk and spaced axially therefrom for relative movement in opposite directions generally parallel to the axis thereof, said member having parts engageable with the beet tops to discharge the latter from the disk, and means for driving said rotary member from said disk driving means.

8. In a power driven machine for harvesting beets and the like, a support, a topping unit comprising linkage connected to the support for vertical floating movement relative thereto, a downwardly extending shaft, a disk carried at the lower end of the shaft for rotation therewith and adapted to sever the tops from the beets, means deriving power from the machine for driving said disk, a rotary member mounted for free floating movement on the topper unit adjacent said disk and axially spaced therefrom for rotation on an axis generally perpendicular to said shaft, said member having parts engageable with the severed beet tops to discharge the latter from the disk, and means drivingly connecting said disk drive means and said rotary member.

9. In a power driven machine for harvesting beets and the like, a support, a topping unit comprising linkage connected to the support for vertical floating movement relative thereto, a downwardly extending shaft, a disk carried at the lower end of the shaft for rotation therewith and adapted to sever the tops from the beets, means deriving power from the machine for driving said disk, an arm pivotally mounted on the topping unit, a member carried on the arm for rotation on an axis generally at right angles to said shaft for swinging movement toward and away from said disk, said member having projections thereon engageable with the severed beet tops to discharge the latter from the disk, and resilient stop means limiting movement of said member toward the disk.

10. In a power driven machine for harvesting beets and the like, a support, a topping unit comprising linkage connected to the support for vertical floating movement relative thereto, a downwardly extending shaft, a disk carried at the lower end of the shaft for rotation therewith and adapted to sever the tops from the beets, means deriving power from the machine for driving said disk, an arm pivotally mounted on the topping unit, a member carried on the arm for rotation on an axis generally at right angles to said shaft for swinging movement toward and away from said disk, said member having projections thereon engageable with the severed beet tops to discharge the latter from the disk, stop means limiting movement of said member toward the disk, and yieldable means resisting movement of the member away from the disk.

11. In a power driven machine for harvesting beets and the like, a support, a topping unit comprising linkage connected to the support for vertical floating movement relative thereto, a downwardly extending shaft, a disk carried at the lower end of the shaft for rotation therewith and adapted to sever the tops from the beets, means deriving power from the machine for driving said disk, an arm pivotally mounted on the topping unit, a member carried on the arm for rotation on an axis generally at right angles to said shaft for swinging movement toward and away from said disk, said member having projections thereon engageable with the severed beet tops to discharge the latter from the disk, stop means limiting movement of said member toward the disk, yieldable means resisting movement of the member away from the disk, and means drivingly connecting said disk drive means and said rotary member.

12. In a power driven machine for harvesting beets and the like, a support, a topping unit comprising linkage connected to the support for vertical movement relative thereto, a downwardly extending shaft structure, a housing therefor, a rotary disk carried by the shaft structure to sever the tops from the beets, means deriving power from the machine for driving said disk, means serving as a bell crank fulcrumed on said shaft housing, a drum carried by one arm of the crank and having fingers projecting radially therefrom, a slidable connection between the other arm of the crank and said housing, and spring means in said connection yieldably accommodating rocking of said bell crank in either direction.

JOHN W. ORENDORFF.

REFERENCES CITED

The following references are of record in the file of this patent:

UNITED STATES PATENTS

| Number | Name | Date |
|---|---|---|
| 765,090 | Lesh | July 12, 1904 |
| 1,568,810 | Djuberg | Jan. 5, 1926 |
| 1,635,494 | Moreau | July 12, 1927 |
| 2,435,350 | Hall | Feb. 3, 1948 |